(12) United States Patent  (10) Patent No.: US 8,447,912 B2
Archer et al.  (45) Date of Patent: May 21, 2013

(54) PAGING MEMORY FROM RANDOM ACCESS MEMORY TO BACKING STORAGE IN A PARALLEL COMPUTER

(75) Inventors: Charles J. Archer, Rochester, MN (US); Michael A. Blocksome, Rochester, MN (US); Todd A. Inglett, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/892,226

(22) Filed: Sep. 28, 2010

(65) Prior Publication Data

US 2012/0079165 A1  Mar. 29, 2012

(51) Int. Cl.
  *G06F 12/00*  (2006.01)
(52) U.S. Cl.
  USPC ........................ 711/6; 711/104; 711/E12.016

(58) Field of Classification Search
  USPC ....................................... 711/6, 104, E12.016
  See application file for complete search history.

(56) References Cited

U.S. PATENT DOCUMENTS

2011/0167194 A1*  7/2011  Scales et al. ...................... 711/6
2012/0017027 A1*  1/2012  Baskakov et al. ................. 711/6

* cited by examiner

*Primary Examiner* — Yong Choe
(74) *Attorney, Agent, or Firm* — Biggers & Ohanian, LLP

(57) ABSTRACT

Paging memory from random access memory ('RAM') to backing storage in a parallel computer that includes a plurality of compute nodes, including: executing a data processing application on a virtual machine operating system in a virtual machine on a first compute node; providing, by a second compute node, backing storage for the contents of RAM on the first compute node; and swapping, by the virtual machine operating system in the virtual machine on the first compute node, a page of memory from RAM on the first compute node to the backing storage on the second compute node.

18 Claims, 8 Drawing Sheets

PAGING MEMORY FROM RANDOM ACCESS MEMORY TO BACKING STORAGE IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for paging memory from random access memory ('RAM') to backing storage in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Collective operations that involve data communications amongst many compute nodes may be carried out with a variety of algorithms. That is, the end result of a collective operation may be achieved in various ways. Some algorithms may provide better performance than other algorithms when operating in particular configurations. What is needed therefore is a way to optimize the selection of the best performing algorithm or set of algorithms to carry out collective operations in particular operating configurations.

SUMMARY OF THE INVENTION

Methods, apparatus, and products for paging memory from RAM to backing storage in a parallel computer, the parallel computer comprising a plurality of compute nodes, including executing a data processing application on a virtual machine operating system in a virtual machine on a first compute node; providing, by a second compute node, backing storage for the contents of RAM on the first compute node; and swapping, by the virtual machine operating system in the virtual machine on the first compute node, a page of memory from RAM on the first compute node to the backing storage on the second compute node.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
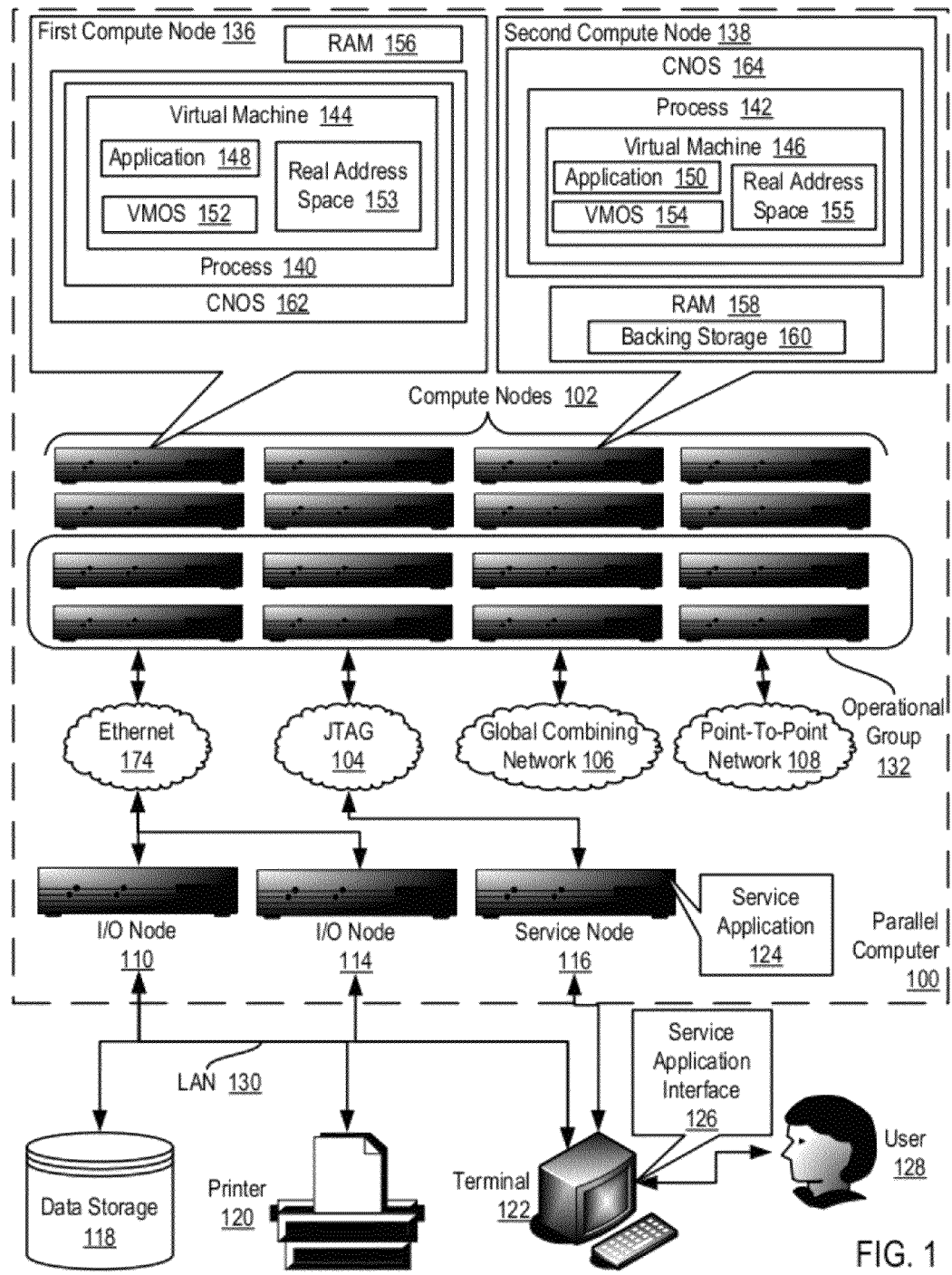
FIG. 1 sets forth an example apparatus for paging memory from RAM to backing storage in a parallel computer according to embodiments of the present invention.

Example methods, apparatus, and products for paging memory from RAM to backing storage in a parallel computer in accordance with the present invention are described with reference to the accompanying drawings, beginning with FIG. 1. FIG. 1 sets forth example apparatus for paging memory from RAM to backing storage in a parallel computer according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of a operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of a operational group. A 'reduce' operation is an example of a collective operation that executes arithmetic or logical functions on data distributed among the compute nodes of a operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The parallel computer of FIG. 1 is configured to page memory according to embodiments of the present invention. Such a parallel computer is typically composed of many compute nodes, but for ease of explanation two of the compute nodes in this example are referenced in particular, a first compute node (136) and a second compute node (138). The first compute node (136) includes RAM (156) and a compute node operating system (162) capable of supporting one or more virtual machines (144). The compute node operating system (162) is a module of computer program instructions and routines for an application program's access to other resources of the compute node. The quantity and complexity of tasks to be performed by an operating system on a compute node in a parallel computer may be smaller and less complex than those of an operating system on a serial computer with many threads running simultaneously. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

In the example of FIG. 1, each virtual machine (144, 146) is implemented as a process (140, 142) running under the compute node operating system (162, 164) on each compute node (136, 138). Each virtual machine (144, 146) has an application (148, 150) executing over a virtual machine operating system (152, 154). Each virtual machine (144, 146) is allocated its own real memory address space (153, 155), which the virtual machines (144, 146) allocate as virtual memory within the virtual machines (144, 146) for use by the applications (148, 150), stack memory, heap memory, and the like.

In the example of FIG. 1, a virtual machine operating system (152) on the virtual machine (144) of the first compute node (136) executes a data processing application (148). In the example of FIG. 1, each virtual machine (144, 146) is a software implementation of a physical machine that executes data processing applications (148, 150) and supports other system-level applications such as, for example, an operating system (152, 154) as if the virtual machine (144, 146) were a physical machine. The virtual machines (144, 146) in the example of FIG. 1 are modules of automated computing machinery that allow the data processing applications (148, 150) to share the underlying physical machine resources of the compute node (136, 138) upon which the virtual machine (144, 146) resides, such as, for example, a central processing unit ('CPU'), RAM (156), and so on.

In the example of FIG. 1, each virtual machine (144, 146) includes a virtual machine operating system (152, 154). Although each virtual machine (144, 146) may include a full implementation of a virtual machine operating system (152, 154), in alternative embodiments each virtual machine (144, 146) may only include an operating system kernel, a microkernel, a nanokernel, a compute node kernel, or other light weight implementation of an operating system.

In the example of FIG. 1, the second compute node (138) provides backing storage (160) for the contents of RAM (156) on the first compute node (136). In the example of FIG. 1, the second compute node (138) executes a data processing application (150) on a virtual machine operating system (154) in a virtual machine (146) on the second compute node (138). The second compute node (138) is therefore a fully functional compute node that, much like the first compute node (136), is capable of carrying out data processing operations. In an alternative embodiment, however, the second compute node (138) may operate as a dedicated provider of backing storage (160) to other compute nodes (102) rather than as a fully operational compute node that carries out data processing operations.

In the example of FIG. 1, each compute node (136, 138) allocates sufficient real memory address space (153, 155) for each virtual machine (144, 146) to prevent the virtual machine operating systems (152, 154) in the virtual machines (144, 146) from experiencing a memory fault due to a memory page eviction requirement. A memory page eviction requirement occurs, for example, when a virtual machine operating system (152, 154) attempts to perform a write operation to virtual memory but there is no virtual memory available. In such an example, a page of memory would need to be evicted from virtual memory in order to make a page of virtual memory available for the virtual machine operating system (152, 154).

In the example of FIG. 1, each compute node (136, 138) can allocate sufficient real memory address space (153, 155) for each virtual machine (144, 146), for example, by measuring the amount of memory utilized by all data processing applications (148, 150) that are executing on each compute node (136, 138) and allocating an amount of real memory address space (153, 155) that is large enough to satisfy memory usage demands of all data processing applications (148, 150) that are executing on each compute node (136, 138). In the particular example of FIG. 1, each compute node (136, 138) executes only one application (148, 150), so that the process of measuring required amount memory need be carried out only for the one application (148, 150). Readers will understand, however, that such a process can be repeated for any number of applications operating on each virtual machine (144, 146).

In the example of FIG. 1, the real memory address space (153, 155) for each virtual machine (144, 146) is allocated by a virtual machine manager in the compute node operating system (162, 164), allocated to the virtual machine (144, 146) which is running as a process under the compute node operating system (162, 164). The real memory address space (153, 155) for each virtual machine (144, 146) is said to be 'allocated' because from the point of view of the compute node operating system (162, 164), the memory space allocated to the virtual machine (144, 146) is virtual memory. From the perspective of the virtual machine (144, 146), however, the memory space allocated to the virtual machine (144, 146) by the compute node operating system (162, 164) is real address space which is in turn allocated to the application (148, 150) running in the virtual machine (144, 146) as virtual memory within the virtual machine (144, 146). This process does not prevent the compute node operating system (162, 164) will experience a memory fault. The compute node operating system (162, 164) may experience a memory fault if its utilization of memory exceeds its real available memory. This process does, however, assure that the virtual machine operating system (144, 146) will never experience a memory fault due to a memory page eviction requirement because the real memory address space from the perspective of the virtual machine (144, 146) can be made large enough to hold all the data required by the virtual machine operating system (144, 146) and its applications (148, 150).

In the example of FIG. 1, the second compute node (138) may provide backing storage (160) for the contents of RAM (156) on the first compute node (136) by configuring RAM (158) on the second compute node (138) as a block device for memory I/O operations from the first compute node (136). In the example of FIG. 1, configuring RAM (158) on the second compute node (138) as a block device for memory I/O operations from the first compute node (136) may be carried out by the compute node operating system (164) on the second compute node (138). In the example of FIG. 1, a block device moves data in nominal sized data blocks. A block device may, for example, move data in 1 Kilobyte blocks, 512 Kilobyte blocks, 1 Megabyte blocks, or in some other block size. In the example of FIG. 1, RAM (158) on the second compute node (138) can be configured as a block device for memory I/O operations from the first compute node (136) such that the first compute node (136) performs memory input operations by requesting one or more data blocks stored in RAM (158) on the second compute node (138). In the example of FIG. 1, RAM (158) on the second compute node (138) can be configured as a block device for memory I/O operations from the first compute node (136) such that the first compute node (136) performs memory output operations by transmitting one or more data blocks to the second compute node (138) for storage in RAM (158) on the second compute node (138). In such an example, RAM (158) on the second compute node (138) is used by the first compute node (136) as if the RAM (158) on the second compute node (138) were a hard disk, floppy disk, optical disc, or other block device accessible by the first compute node (136).

In the example of FIG. 1, the virtual machine operating system (152) in the virtual machine (144) on the first compute node (136) implements paging memory from RAM to backing storage by swapping a page of memory from RAM (156) on the first compute node (136) to the backing storage (160) on the second compute node (138). In the example of FIG. 1, the virtual machine operating system (152) in the virtual machine (144) on the first compute node (136) swaps a page of memory from RAM (156) on the first compute node (136) to the backing storage (160) on the second compute node (138), for example, by writing the page of memory to the backing storage (160) on the second compute node (138) and freeing up the page of memory in RAM (156) on the first compute node (136) such that the portion of RAM (156) on the first compute node (136) that was used to store the page of memory is available for use by data processing applications (148) executing on the first compute node (136).

In the example of FIG. 1, the virtual machine operating system (152) in the virtual machine (144) on the first compute node (136) may swap a page of memory from RAM (156) on the first compute node (136) to the backing storage (160) on the second compute node (138) by blocking I/O to and from RAM (156) on the first compute node (136) to and from RAM (158) on the second compute node (138). In the example of FIG. 1, blocking (172) I/O to and from RAM (156) on the first compute node (136) to and from RAM (158) on the second compute node (138) may be carried out, for example, by redirecting all I/O requests to and from RAM (156) on the first compute node (136) to the second compute node (138) such that I/O requests are I/O requests to and from RAM (158) on the second compute node (138).

The arrangement of nodes, networks, and I/O devices making up the example apparatus illustrated in FIG. 1 are for explanation only, not for limitation of the present invention. Apparatus capable of paging memory from RAM to backing storage in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of paging memory from RAM to backing storage in a parallel computer according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Paging memory from RAM to backing storage in a parallel computer according to embodiments of the present invention is generally implemented on a parallel computer that includes a plurality of compute nodes organized for collective operations through at least one data communications network. In fact, such parallel computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of paging memory from RAM to backing storage according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. Application program (159) executes collective operations by calling software routines in parallel communications library (161). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
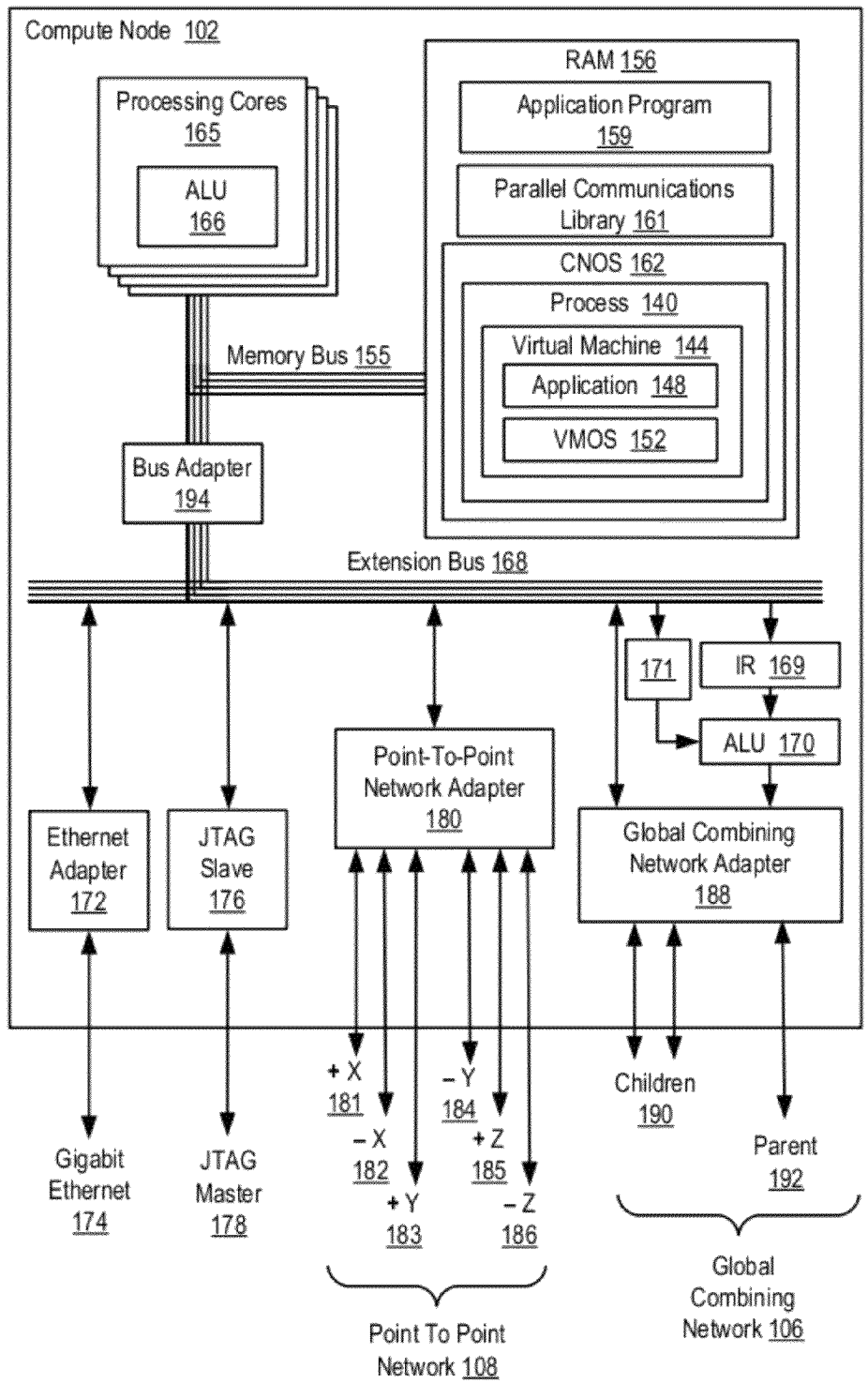
FIG. 2 sets forth a block diagram of an example compute node useful in a parallel computer capable of paging memory from RAM to backing storage according to embodiments of the present invention.

Also stored in RAM (156) is a compute node operating system (162), a module of computer program instructions and routines for an application program's access to other resources of the compute node. It is typical for an application program (159) and parallel communications library (161) in a compute node (102) of a parallel computer to run a single thread of execution with no user login and no security issues because the thread is entitled to complete access to all resources of the compute node (102). The quantity and complexity of tasks to be performed by the compute node operating system (162) on the compute node (102) in a parallel computer therefore are smaller and less complex than those of an operating system on a serial computer with many threads running simultaneously. In addition, there is no video I/O on the compute node (102) of FIG. 2, another factor that decreases the demands on the compute node operating system (162). The compute node operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art. In the example of FIG. 2, the compute node operating system (162) of FIG. 2 is capable of supporting one or more virtual machines (144). The compute node operating system (162) of FIG. 2 may therefore include virtual machine management components such as, for example, a hypervisor or other module of automated computing machinery capable of supporting one or more virtual machines (144).

In the example of FIG. 2, the virtual machine (144) may include an application (148) and a virtual machine operating system (152). Although the virtual machine (144) may include a full implementation of a virtual machine operating system (152), in alternative embodiments the virtual machine (152) may only include an operating system kernel, a microkernel, a nanokernel, a compute node kernel, or other light weight implementation of an operating system. In the example of FIG. 2, such a virtual machine (144) is implemented as a process (140) running under the compute node operating system (162) of the compute node (102).

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus that page memory from RAM to backing storage in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes for paging memory from RAM to backing storage in a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output.

The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

The example compute node (102) of FIG. 2 is included in a parallel computer that includes a plurality of compute nodes. The example compute node (102) of FIG. 2 can page memory from RAM (156) in the compute node (102) to backing storage that is provided by another compute node in the parallel computer. The example compute node (102) of FIG. 2 can page memory from RAM (156) in the compute node (102) to backing storage that is provided by another compute node in the parallel computer by swapping, by the virtual machine operating system (152) in the virtual machine (144) on the compute node (102), a page of memory from RAM (156) on the compute node (102) to the backing storage on another compute node in the parallel computer.

Figure 3A:
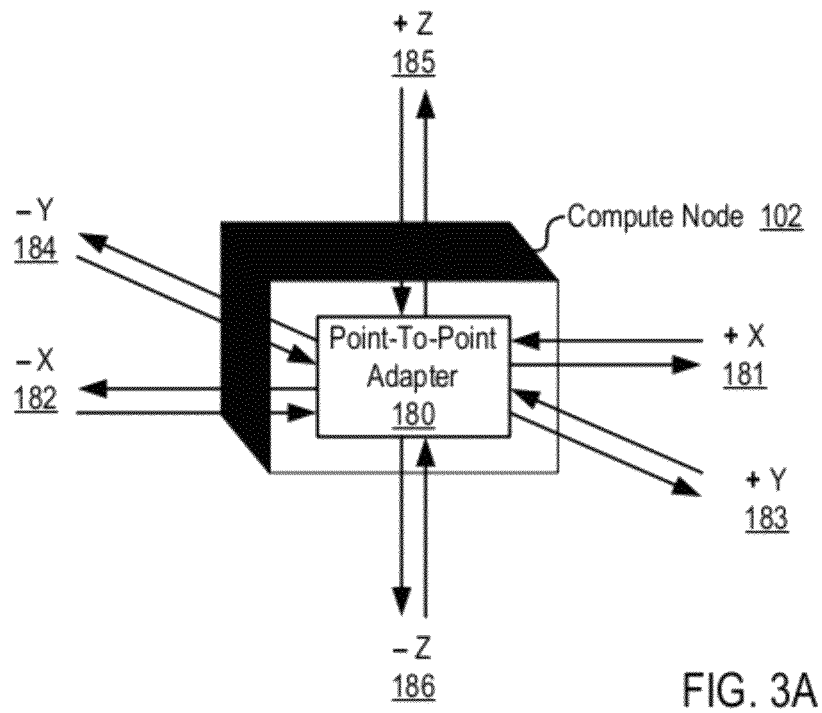
FIG. 3A sets forth a block diagram of an example Point-To-Point Adapter useful in systems for paging memory from RAM to backing storage in a parallel computer according to embodiments of the present invention.

For further explanation, FIG. 3A sets forth a block diagram of an example Point-To-Point Adapter (180) useful in systems for paging memory from RAM to backing storage in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
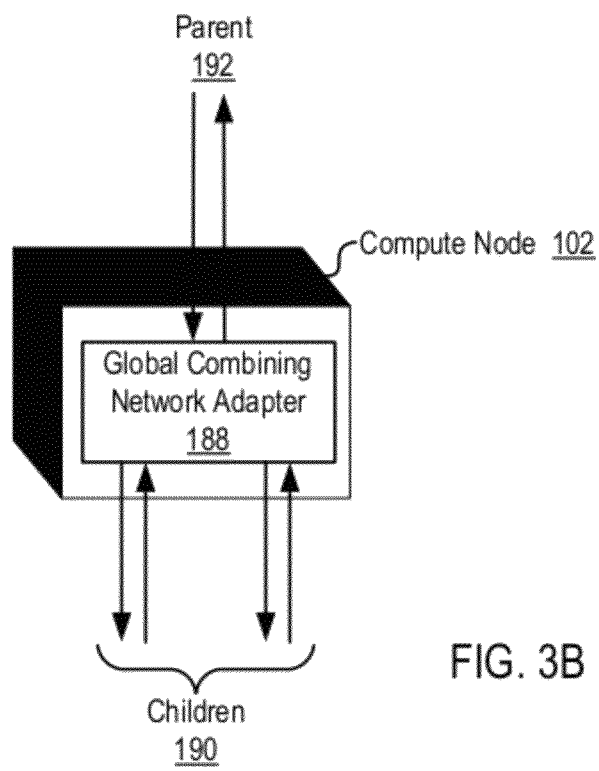
FIG. 3B sets forth a block diagram of an example Global Combining Network Adapter useful in systems for paging memory from RAM to backing storage in a parallel computer according to embodiments of the present invention.

For further explanation, FIG. 3B sets forth a block diagram of an example Global Combining Network Adapter (188) useful in systems for paging memory from RAM to backing storage in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
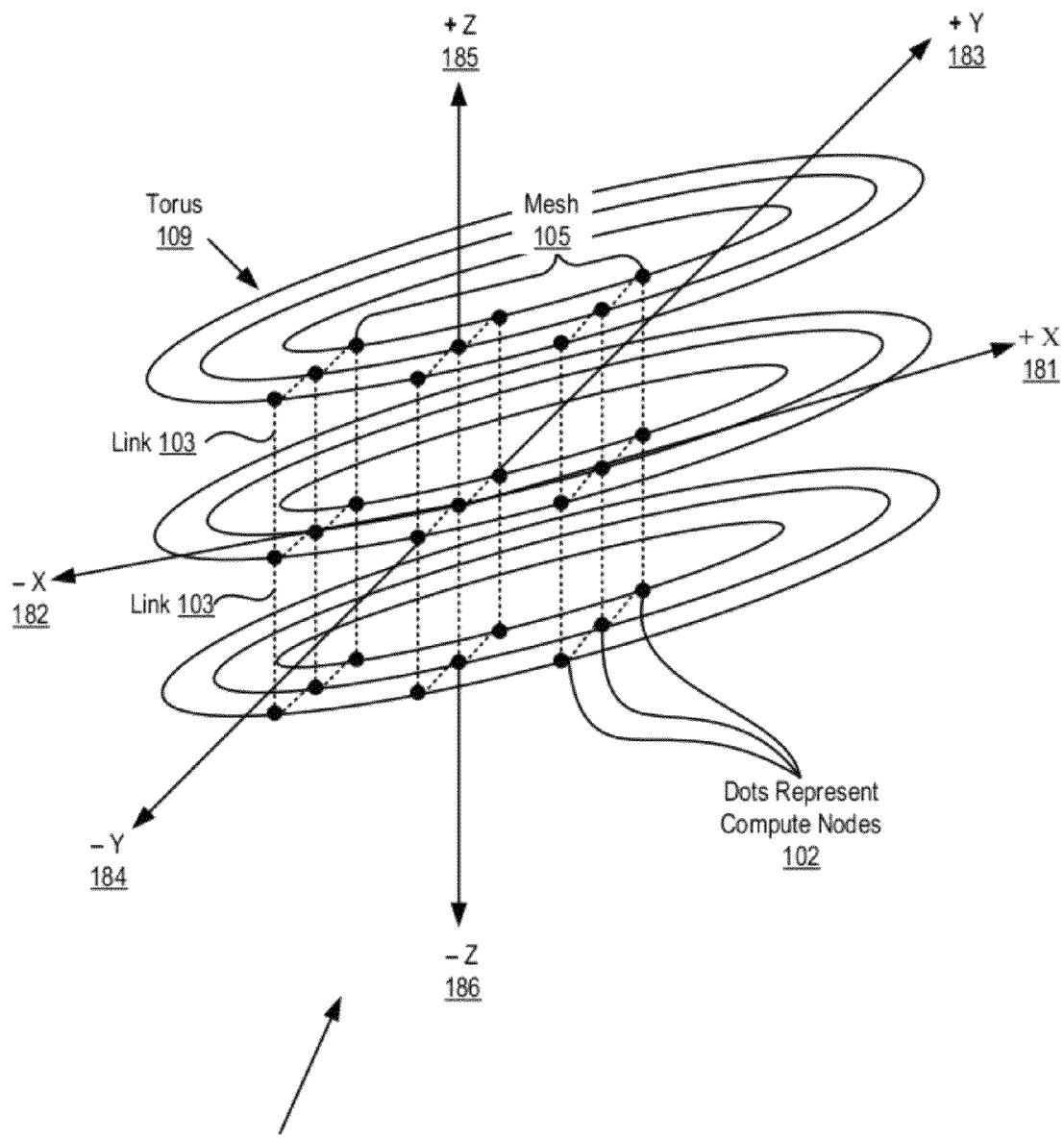
FIG. 4 sets forth a line drawing illustrating an example data communications network optimized for point-to-point operations useful in systems capable of paging memory from RAM to backing storage in a parallel computer according to embodiments of the present invention.

For further explanation, FIG. 4 sets forth a line drawing illustrating an example data communications network (108) optimized for point-to-point operations useful in systems capable of paging memory from RAM to backing storage in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (109). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in paging memory from RAM to backing storage in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in paging memory from RAM to backing storage in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene $Q_{TM}$.

Figure 5:
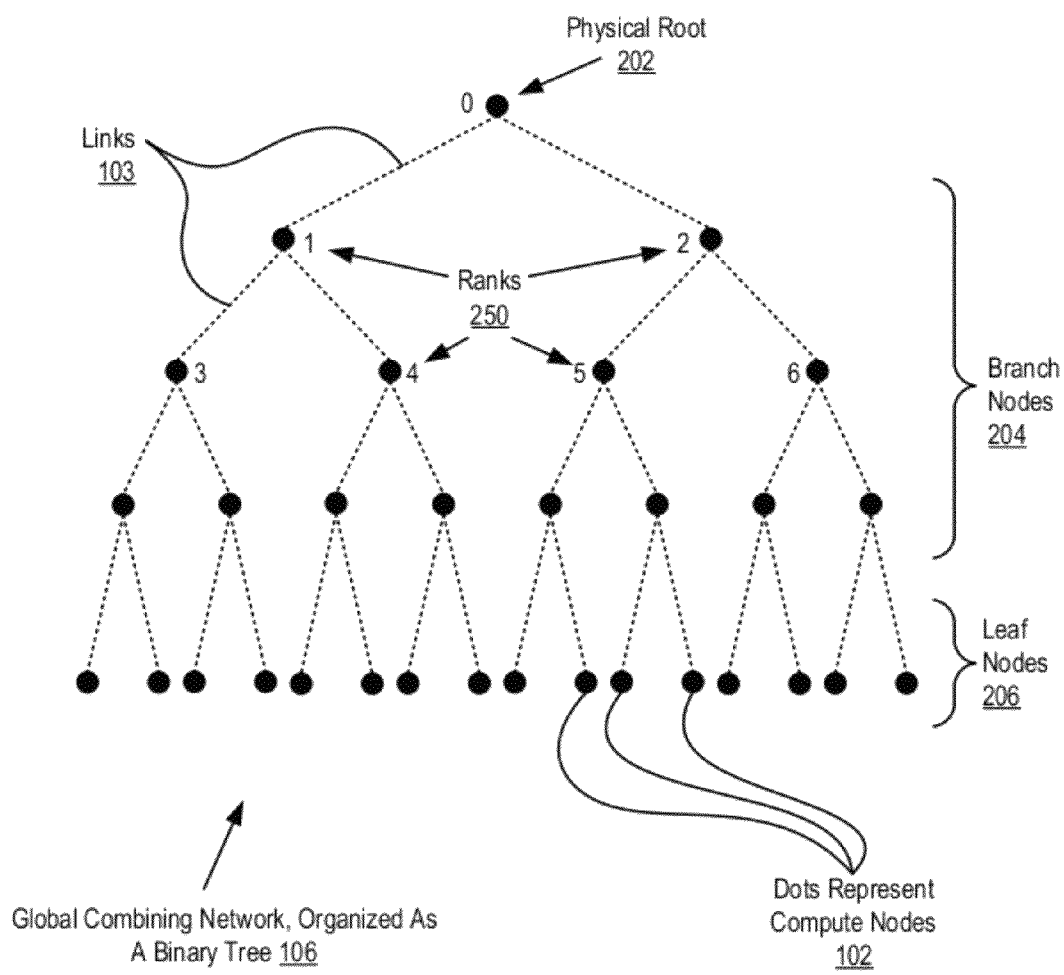
FIG. 5 sets forth a line drawing illustrating an example global combining network useful in systems capable of paging memory from RAM to backing storage in a parallel computer according to embodiments of the present invention.

For further explanation, FIG. 5 sets forth a line drawing illustrating an example global combining network (106) useful in systems capable of paging memory from RAM to backing storage in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in paging memory from RAM to backing storage in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
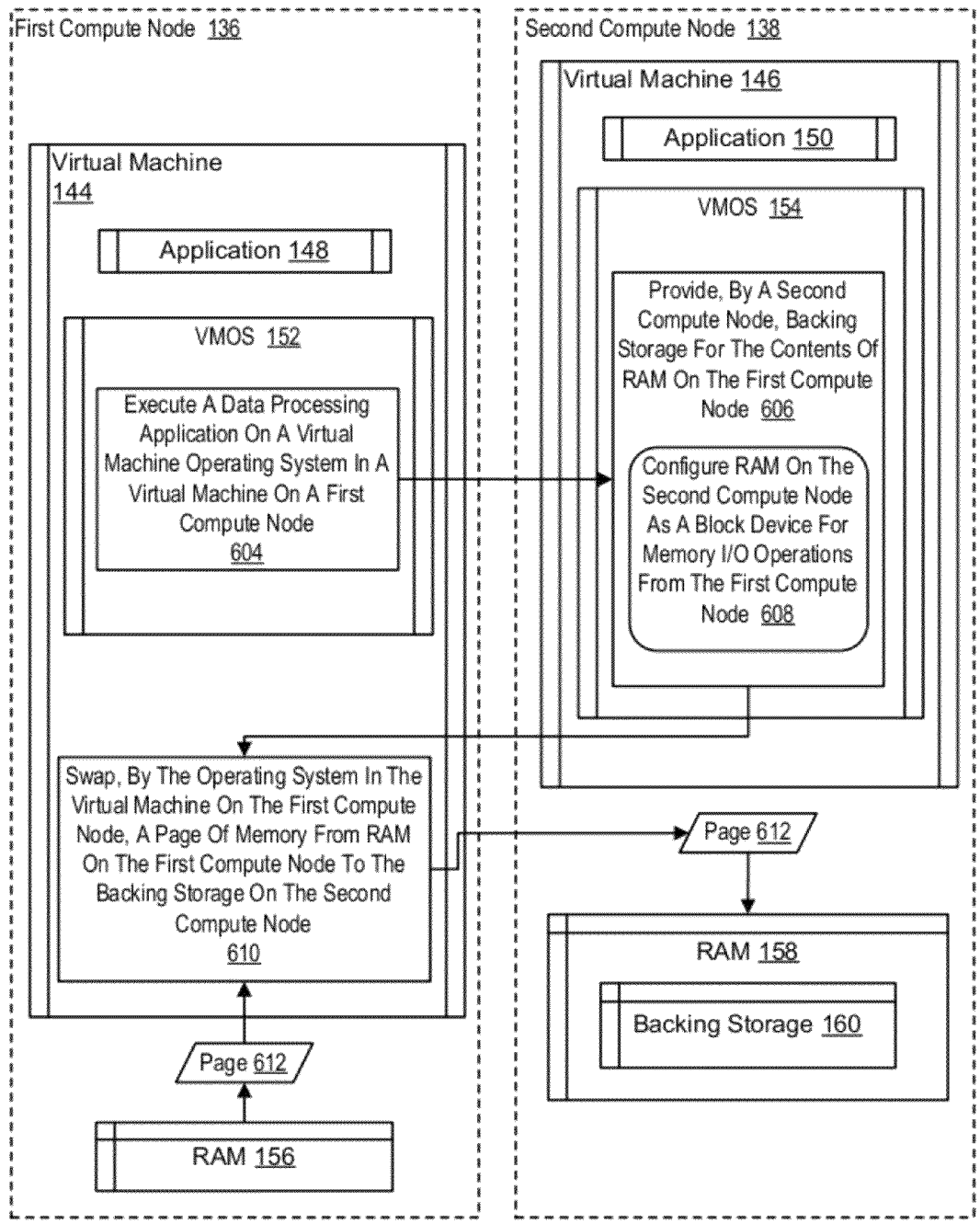
FIG. 6 sets forth a flow chart illustrating an example method for paging memory from RAM to backing storage in a parallel computer according to embodiments of the present invention.

For further explanation, FIG. 6 sets forth a flow chart illustrating an example method of paging memory from RAM to backing storage in a parallel computer according to embodiments of the present invention. The method of FIG. 6 includes executing (604) a data processing application (148) on a virtual machine operating system (152) in a virtual machine (144) on a first compute node (136). In the example of FIG. 6, the virtual machine (144) is a software implementation of a physical machine that executes data processing applications (148) and supports other system-level applications such as, for example, a virtual machine operating system (152) as if the virtual machine (144) were a physical machine. The virtual machine (144) in the example of FIG. 6 is a module of automated computing machinery configured to allow the data processing applications (148) to share the underlying physical machine resources of the compute node (136) upon which the virtual machine (144) resides such as, for example, a CPU, RAM (156), and so on. The virtual machine (144) runs its own, separate operating system (156) that presents system resources to the data processing application (148) as though the data processing application (148) were running on a completely separate compute node. That is, the virtual machine (144) is 'virtual' in the sense of being a complete computer or compute node in almost every respect. The only sense in which the virtual machine (144) is not a complete compute node is that the virtual machine (144) usually makes available to an data processing application (148) or a virtual machine operating system (152) only a portion of the underlying hardware resources of the compute node (136), particularly memory, CPU, and I/O resources. Otherwise, and always from the point of view of the data processing application (148), the virtual machine (144) is a compute node.

The method of FIG. 6 also includes providing (606), by a second compute node (138), backing storage (160) for the contents of RAM (156) on the first compute node (136). In the example of FIG. 6, backing storage (160) on the second compute node (138) can include a portion of RAM (158) on the second compute node (138), a portion of a disk drive (not shown) on the second compute node (138), or other computer memory accessible by the second compute node (138). Providing (606), by a second compute node (138), backing storage (160) for the contents of RAM (156) on the first compute node (136) can be carried out, for example, by making some identified portion of the backing storage (160) on the second compute node (136) available to the first compute node (136) for writing data to, and reading data from, the identified portion of the backing storage (160).

In the example of FIG. 6, the second compute node (138) executes a data processing application (150) on a virtual machine operating system (154) in a virtual machine (146) on the second compute node (138). In the example of FIG. 6, the virtual machine (146) on the second compute node (138) is a software implementation of a physical machine that executes data processing applications (150) and supports other system-level applications such as, for example, a virtual machine operating system (154) as if the virtual machine (146) were a physical machine.

In the example of FIG. 6, providing (606) by the second compute node (138) backing storage (160) for the contents of RAM (156) on the first compute node (136) can include configuring (608) RAM (158) on the second compute node (138) as a block device for memory I/O operations from the first compute node (136). In the example of FIG. 6, a block device moves data in nominal sized data blocks. A block device may, for example, move data in 1 Kilobyte blocks, 512 Kilobyte blocks, 1 Megabyte blocks, or in some other block size. In the example of FIG. 6, RAM (158) on the second compute node (138) can be configured as a block device for memory I/O operations from the first compute node (136) such that the first compute node (136) performs memory input operations by requesting one or more data blocks stored in RAM (158) on the second compute node (138). In the example of FIG. 6, RAM (158) on the second compute node (138) can be configured as a block device for memory I/O operations from the first compute node (136) such that the first compute node (136) performs memory output operations by transmitting one or more data blocks to the second compute node (138) for storage in RAM (158) on the second compute node (138). In such an example, RAM (158) on the second compute node (138) is used by the first compute node (136) as if the RAM (158) on the second compute node (138) were a hard disk, floppy disk, optical disc, or other block device accessible by the first compute node (136).

The example of FIG. 6 also includes swapping (610), by the virtual machine operating system (152) in the virtual machine (144) on the first compute node (136), a page (612) of memory from RAM (156) on the first compute node (136) to the backing storage (160) on the second compute node (138). In the example of FIG. 6, swapping (610) a page (612) of memory from RAM (156) on the first compute node (136) to the backing storage (160) on the second compute node (138) may be carried out, for example, by writing the page (612) of memory to the backing storage (160) on the second compute node (138) and freeing up the page (612) of memory in RAM (156) on the first compute node (136) such that the portion of RAM (156) on the first compute node (136) that was used to store the page (612) of memory is available for use by data processing applications (148) executing on the first compute node (136).

Figure 7:
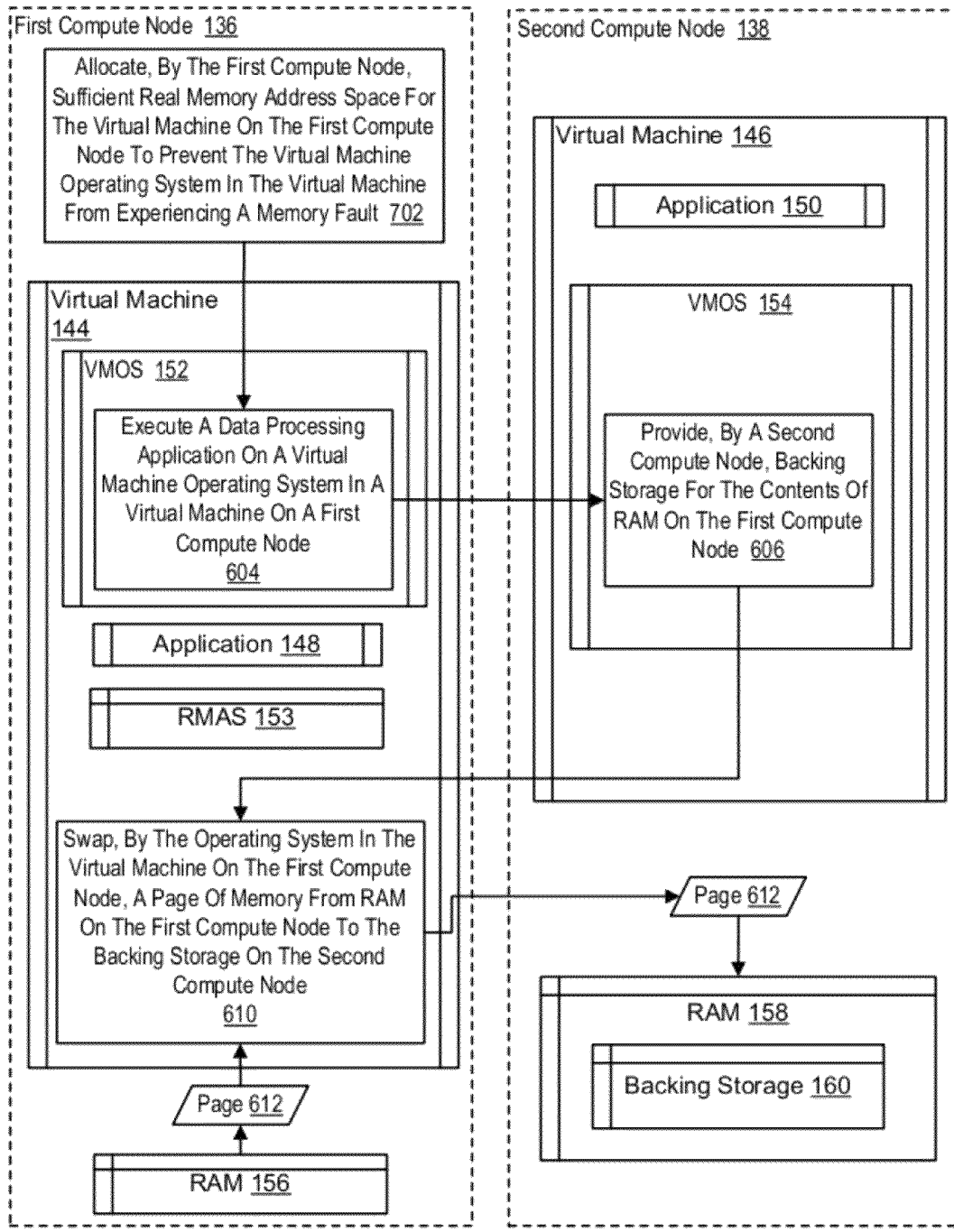
FIG. 7 sets forth a flow chart illustrating an example method for paging memory from RAM to backing storage in a parallel computer according to embodiments of the present invention.

For further explanation, FIG. 7 sets forth a flow chart illustrating an example method for paging memory from RAM to backing storage in a parallel computer according to embodiments of the present invention. The method of FIG. 7 is similar to the example of FIG. 6 as it also includes executing (604) a data processing application (148) on a virtual machine operating system (152) in a virtual machine (144) on a first compute node (136), providing (606) backing storage (160) for the contents of RAM (156) on the first compute node (136) by a second compute node (138), and swapping (610) a page (612) of memory from RAM (156) on the first compute node (136) to the backing storage (160) on the second compute node (138) as described with reference to FIG. 6.

The method of FIG. 7 also includes allocating (702), by the first compute node (136), sufficient real memory address space (153) for the virtual machine (144) on the first compute node (136) to prevent the virtual machine operating system (152) from experiencing a memory fault due to a memory page eviction requirement. A memory page eviction requirement occurs, for example, when the virtual machine operating system (152) attempts to perform a write operation to virtual memory but there is no virtual memory available. In such an example, a page of memory would need to be evicted from virtual memory in order to make a page of virtual memory available for the virtual machine operating system (152).

In the example of FIG. 7, the compute node (136) can allocate (702) sufficient real memory address space (153) for the virtual machine (144), for example, by measuring the amount of memory utilized by all data processing applications (148) that are executing on the compute node (136) and allocating an amount of real memory address space (153) that is large enough to satisfy memory usage demands of all the data processing applications (148) that are executing on the first compute node (136). In the particular example of FIG. 7, the compute node (136) executes only one application (148), so that the process of measuring the required amount memory need be carried out only for the one application (148). Readers will understand, however, that such a process can be repeated for any number of applications operating on each virtual machine (144).

In the example of FIG. 7, the real memory address space (153) for the virtual machine (144) may be allocated (702) by a virtual machine manager in a compute node operating system (not shown) as described with reference to FIG. 1. The real memory address space (153) for the virtual machine (144) is said to be 'allocated' because from the point of view of such a compute node operating system, the memory space allocated to the virtual machine (144) is virtual memory. From the perspective of the virtual machine (144), however, the memory space allocated to the virtual machine (144) is real address space which is in turn allocated to the application (148) running in the virtual machine (144) as virtual memory within the virtual machine (144).

Figure 8:
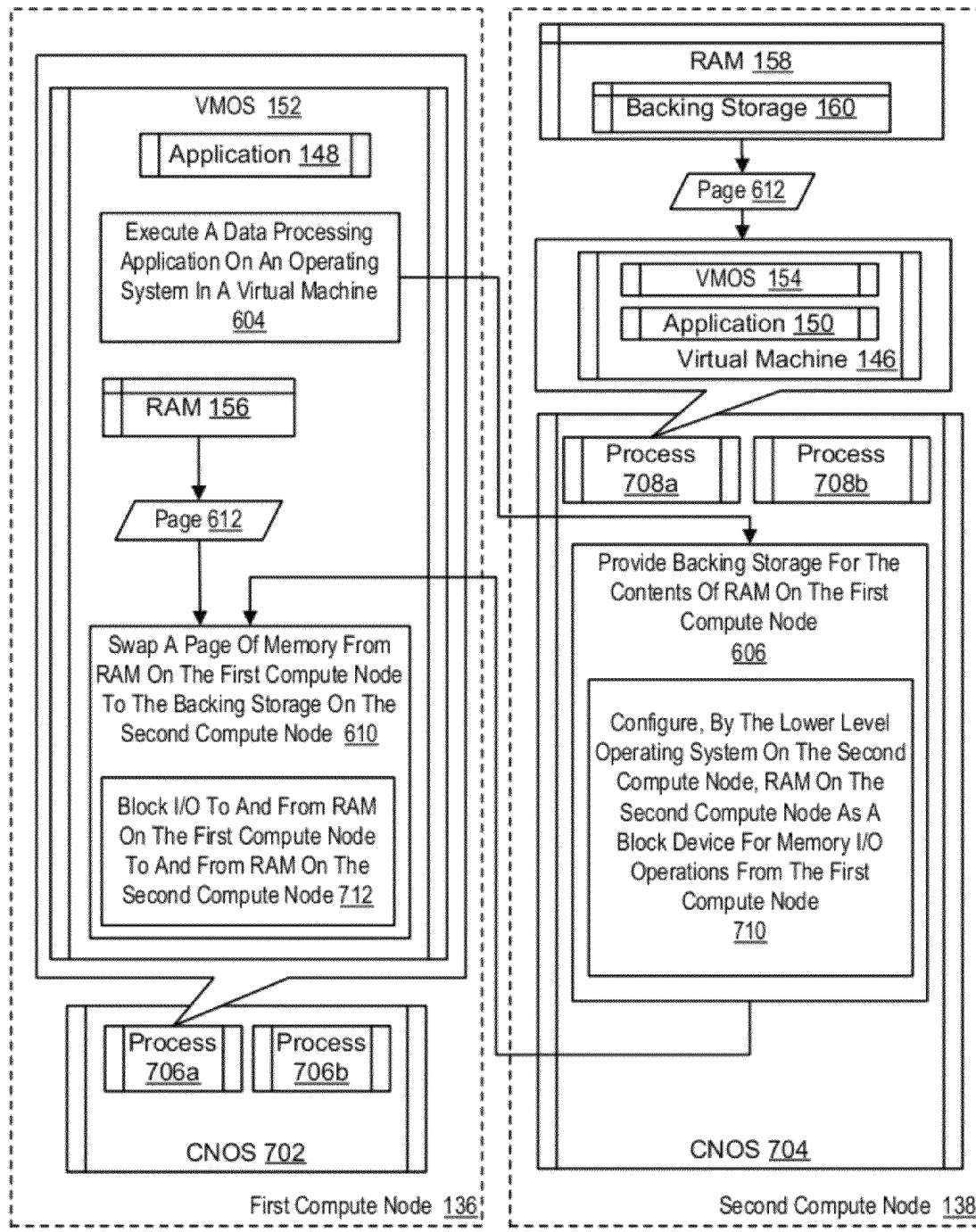
FIG. 8 sets forth a flow chart illustrating an example method for paging memory from RAM to backing storage in a parallel computer according to embodiments of the present invention.

For further explanation, FIG. 8 sets forth a flow chart illustrating an example method for paging memory from RAM to backing storage in a parallel computer according to embodiments of the present invention. The method of FIG. 8 is similar to the example of FIG. 6 as it also includes executing (604) a data processing application (148) on a virtual machine operating system (152) in a virtual machine (144) on a first compute node (136), providing (606) backing storage (160) for the contents of RAM (156) on the first compute node (136) by a second compute node (138), and swapping (610) a page (612) of memory from RAM (156) on the first compute node (136) to the backing storage (160) on the second compute node (138) as described with reference to FIG. 6.

In the example of FIG. 8, each virtual machine (144, 146) is implemented as a process (706a, 706b, 708a, 708b) running under a compute node operating system (702, 704) on each compute node (136, 138). In the example of FIG. 8, the compute node operating systems (702, 704) can be embodied as any operating system capable of supporting virtual machines (144, 146) such as, for example, Linux™. In the example of FIG. 8, each virtual machine (144, 146) is invoked as a process (706a, 706b, 708a, 708b) such that each compute node (136, 138) may support multiple virtual machines (144, 146) that share the underlying resources of the compute node (136, 138) upon which the virtual machines (144, 146) execute. In an embodiment in which multiple virtual machines are running on a single compute node, the virtual machines may utilize inter-process communication techniques to communicate with each other given that each virtual machine is implemented as a process.

In the example of FIG. 8, providing (606) by the second compute node (138) backing storage (160) for the contents of RAM (156) on the first compute node (136) includes configuring (710), by the compute node operating system (704) on the second compute node (138), RAM (158) on the second compute node (138) as a block device for memory I/O operations from the first compute node (136). In the example of FIG. 6, the compute node operating system (704) on the second compute node (138) can configure RAM (158) on the second compute node (138) as a block device for memory I/O operations from the first compute node (136), for example, by setting aside a predetermined portion of the RAM (158) on the second compute node (138) for block-based read and write operations from the first compute node (136). The compute node operating system (704) may oversee such block-based read and write operations from the first compute node (136), for example, through the use of a page table that indicates which 'blocks' of the RAM (158) on the second compute node (138) are free and which 'blocks' of the RAM (158) on the second compute node (138) are unavailable. Although the RAM (158) on the second compute node (138) may not actually be blocked memory, the RAM (158) on the second compute node (138) may be treated as blocked memory by reading and writing from the RAM (158) in predetermined block sizes.

In the example of FIG. 8, swapping (610), by the virtual machine operating system (152) in the virtual machine (144) on the first compute node (136), a page (612) of memory from RAM (156) on the first compute node (136) to the backing storage (160) on the second compute node (138) includes blocking (172) I/O to and from RAM (156) on the first compute node (136) to and from RAM (158) on the second compute node (138). In the example of FIG. 8, blocking (172) I/O to and from RAM (156) on the first compute node (136) to and from RAM (158) on the second compute node (138) may be carried out, for example, by redirecting all I/O requests to and from RAM (156) on the first compute node (136) to the second compute node (138) such that I/O requests are I/O requests to and from RAM (158) on the second compute node (138).

Example embodiments of the present invention are described largely in the context of a fully functional computer system for paging memory from RAM to backing storage in a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of paging memory from random access memory ('RAM') to backing storage in a parallel computer, the parallel computer comprising a plurality of compute nodes, the method comprising:
executing a data processing application on an virtual machine operating system in a virtual machine on a first compute node;
providing, by a second compute node, backing storage for the contents of RAM on the first compute node; and
swapping, by the virtual machine operating system in the virtual machine on the first compute node, a page of memory from RAM on the first compute node to the backing storage on the second compute node.

2. The method of claim 1 wherein the second compute node executes a data processing application on a virtual machine operating system in a virtual machine on the second compute node.

3. The method of claim 2 wherein:
each virtual machine is implemented as a process running under a compute node operating system on each compute node; and
providing by the second compute node backing storage for the contents of RAM on the first compute node further comprises configuring, by the compute node operating system on the second compute node, RAM on the second compute node as a block device for memory I/O ('input/output') operations from the first compute node.

4. The method of claim 1 further comprising allocating, by the first compute node, sufficient real memory address space for the virtual machine on the first compute node to prevent the virtual machine operating system from experiencing a memory fault due to a memory page eviction requirement.

5. The method of claim 1 wherein providing by a second compute node backing storage for the contents of RAM on the first compute node further comprises configuring RAM on the second compute node as a block device for memory I/O ('input/output') operations from the first compute node.

6. The method of claim 1 wherein swapping, by the virtual machine operating system in the virtual machine on the first compute node, a page of memory from RAM on the first compute node to the backing storage on the second compute node further comprises blocking I/O ('input/output') to and from RAM on the first compute node to and from RAM on the second compute node.

7. Apparatus for paging memory from random access memory ('RAM') to backing storage in a parallel computer, the parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:
executing a data processing application on a virtual machine operating system in a virtual machine on a first compute node;
providing, by a second compute node, backing storage for the contents of RAM on the first compute node; and
swapping, by the virtual machine operating system in the virtual machine on the first compute node, a page of memory from RAM on the first compute node to the backing storage on the second compute node.

8. The apparatus of claim 7 wherein the second compute node executes a data processing application on a virtual machine operating system in a virtual machine on the second compute node.

9. The apparatus of claim 8 wherein:
each virtual machine is implemented as a process running under a compute node operating system on each compute node; and
providing by the second compute node backing storage for the contents of RAM on the first compute node further comprises configuring, by the compute node operating system on the second compute node, RAM on the second compute node as a block device for memory I/O ('input/output') operations from the first compute node.

10. The apparatus of claim 7 further comprising computer program instructions that, when executed by the computer processor, cause the apparatus to carry out the step of allocating, by the first compute node, sufficient real memory address space for the virtual machine on the first compute node to prevent the virtual machine operating system from experiencing a memory fault due to a memory page eviction requirement.

11. The apparatus of claim 7 wherein providing by a second compute node backing storage for the contents of RAM on the first compute node further comprises configuring RAM on the second compute node as a block device for memory I/O ('input/output') operations from the first compute node.

12. The apparatus of claim 7 wherein swapping, by the virtual machine operating system in the virtual machine on the first compute node, a page of memory from RAM on the first compute node to the backing storage on the second compute node further comprises blocking I/O ('input/output') to and from RAM on the first compute node to and from RAM on the second compute node.

13. A computer program product for paging memory from random access memory ('RAM') to backing storage in a parallel computer, the parallel computer comprising a plurality of compute nodes, the computer program product disposed upon a non-transitory computer readable storage medium, the computer program product comprising computer program instructions that, when executed, cause a computer to carry out the steps of:
   executing a data processing application on a virtual machine operating system in a virtual machine on a first compute node;
   providing, by a second compute node, backing storage for the contents of RAM on the first compute node; and
   swapping, by the virtual machine operating system in the virtual machine on the first compute node, a page of memory from RAM on the first compute node to the backing storage on the second compute node.

14. The computer program product of claim 13 wherein the second compute node executes a data processing application on a virtual machine operating system in a virtual machine on the second compute node.

15. The computer program product of claim 14 wherein:
   each virtual machine is implemented as a process running under a compute node operating system on each compute node; and
   providing by the second compute node backing storage for the contents of RAM on the first compute node further comprises configuring, by the compute node operating system on the second compute node, RAM on the second compute node as a block device for memory I/O ('input/output') operations from the first compute node.

16. The computer program product of claim 13 further comprising computer program instructions that, when executed, cause the computer to carry out the step of allocating, by the first compute node, sufficient real memory address space for the virtual machine on the first compute node to prevent the virtual machine operating system from experiencing a memory fault due to a memory page eviction requirement.

17. The computer program product of claim 13 wherein providing by a second compute node backing storage for the contents of RAM on the first compute node further comprises configuring RAM on the second compute node as a block device for memory I/O ('input/output') operations from the first compute node.

18. The computer program product of claim 13 wherein swapping, by the virtual machine operating system in the virtual machine on the first compute node, a page of memory from RAM on the first compute node to the backing storage on the second compute node further comprises blocking I/O ('input/output') to and from RAM on the first compute node to and from RAM on the second compute node.

* * * * *